United States Patent
Smoot (10) Patent No.: US 7,640,292 B1
(45) Date of Patent: Dec. 29, 2009

(54) PHYSICAL SERVER TO VIRTUAL SERVER MIGRATION

(75) Inventor: Peter L. Smoot, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 683 days.

(21) Appl. No.: 11/117,967

(22) Filed: Apr. 29, 2005

(51) Int. Cl.
G06F 15/16 (2006.01)
G06F 9/455 (2006.01)

(52) U.S. Cl. .......................................... 709/202; 718/1

(58) Field of Classification Search ................. 709/225, 709/202
See application file for complete search history.

(56) References Cited

U.S. PATENT DOCUMENTS

| | | | |
|---|---|---|---|
| 5,363,487 A * | 11/1994 | Willman et al. ................. | 710/8 |
| 6,757,695 B1 * | 6/2004 | Noveck et al. .............. | 707/200 |
| 6,801,992 B2 * | 10/2004 | Gajjar et al. ................ | 711/173 |
| 7,143,307 B1 * | 11/2006 | Witte et al. ..................... | 714/6 |
| 7,188,170 B1 * | 3/2007 | Burnley et al. .............. | 709/224 |
| 7,194,519 B1 * | 3/2007 | Muhlestein et al. ......... | 709/215 |
| 7,484,208 B1 * | 1/2009 | Nelson .......................... | 718/1 |
| 2003/0195940 A1 * | 10/2003 | Basu et al. ................... | 709/213 |
| 2004/0044707 A1 * | 3/2004 | Richard ....................... | 707/204 |
| 2005/0262246 A1 * | 11/2005 | Menon et al. ................ | 709/226 |
| 2005/0289540 A1 * | 12/2005 | Nguyen et al. ................. | 718/1 |
| 2006/0005189 A1 * | 1/2006 | Vega et al. ...................... | 718/1 |
| 2006/0010176 A1 * | 1/2006 | Armington .................. | 707/204 |
| 2006/0155708 A1 * | 7/2006 | Brown et al. .................. | 707/10 |
| 2006/0155912 A1 * | 7/2006 | Singh et al. ..................... | 711/6 |

OTHER PUBLICATIONS

VMware Eases Move to Virtual World with P2V Assistant. (Jul. 21). PR Newswire. New York: Jul 21, 2003. p. 1, from Business Dateline database. (Document ID: 372687011). http://proquest.umi.com/pqdweb?did=372687011&sid=1&Fmt=3&clientId=19649&RQT=309&VName=PQD.*

Fast Transparent Migration for Virtual Machines. Michael Nelson, Beng-Hong Lim, and Greg Hutchins. VMware, Inc. Palo Alto, CA 94304, Apr. 9, 2005 http://www.vmware.com/pdf/usenix_vmotion.pdf.*

Server Consolidation and Migration with VSMT, Microsoft, Published: Oct. 22, 2004 http://www.microsoft.com/windowsserversystem/virtualserver/overview/vsmtwhitepaper.mspx.*

VMware P2V Assistant 1.0 User's Manual, Version 1.0, Published: Aug. 27, 2003 http://www.vmware.com/support/pubs/p2v_pubs.html.*

Blogcast on Virtual Server Migration Toolkit (VSMT)— Part 1—John Howard—Jan. 4, 2005 http://blogs.tech net.com/jhoward/archive/2005/01/04/blogcast-on-virtual-server-migration-toolkit-vsmt-part-1.aspx.*

* cited by examiner

*Primary Examiner*—Jeffrey Pwu
*Assistant Examiner*—Noel Beharry
(74) *Attorney, Agent, or Firm*—Perkins Coie LLP (57) ABSTRACT

According to an embodiment of the invention, a physical server is migrated to a virtual server, which may then be adopted by a new physical server. When the physical server is migrated, the physical server contacts a multi-appliance management application to determine a location on a storage network for replacement storage. The physical server copies its data volumes to the replacement storage. The migration process also converts the operating system of the physical server into a virtual server. The virtual server is a software incarnation of the physical server, and can be run using a generic hardware server. The data of the physical server stored in the replacement storage is linked to the virtual server. In this way, a physical server is migrated to a virtual server.

27 Claims, 7 Drawing Sheets

PHYSICAL SERVER TO VIRTUAL SERVER MIGRATION

FIELD OF INVENTION

The invention generally relates to virtual servers and specifically relates to methods and apparatuses for migrating a physical server to a virtual server.

BACKGROUND

A server is a processing system that offers some type of service to local or remote clients. The clients may be attached to the server through a network such as a local area network (LAN) or a wide area network (WAN). The server typically includes data storage in the form of drives, such as magnetic or optical drives, that may store applications and application data, as well as an operating system on a boot drive. Server hardware may become obsolete in a relatively short period of time (e.g., 2-3 years), necessitating the frequent replacement of the server hardware.

A server may perform a specific function. The function is generally designated in the server's operating system. For example, a storage server, such as a file server (or filer) provides data storage and access to clients. Other types of servers may provide computing services or network access. The operating system of each server is tailored to the intended function of the server. For example, the operating system of a filer includes subroutines to provide network access and file service to remote clients.

A user of computing services may have several servers performing different functions. When a server's hardware becomes obsolete, the user often wants to continue using the functionality of the server, but on newer, more powerful, and more reliable hardware. The operating system and the data stored by the server can be migrated from old hardware to new hardware. This is known as server migration.

Server migration typically comprises a process known as physical migration. Physical migration involves transporting the data stored on a server to a new server. Mass storage devices within a server, such as disk drives, are physical entities and have physically discrete storage parameters. Physical migration typically includes copying the contents of the drives of the old server to different drives of the new server. Since the drives of the new server rarely match the capacity of the drives of the old server, the new server often will not have the same storage characteristics of the old server.

Sever migration is frequently a necessary procedure. For a user that owns several servers, server migration may require frequent time consuming and mistake-laden physical migrations. What is needed, therefore, is a way to streamline and improve server migration.

SUMMARY

The present invention includes methods and apparatuses for Physical Server to Virtual Server Migration. In one method, replacement storage for a data volume is requested from a storage management device. A replacement storage location of the replacement storage is then received from the storage management device. The data volume is copied to the replacement storage. A virtual server image location for storage of a virtual server image is then requested, and the virtual server image is copied to the virtual server image location.

Other aspects of the invention will be apparent from the accompanying figures and from the detailed description which follows.

DETAILED DESCRIPTION

Described herein are methods and apparatuses for Physical Server to Virtual Server Migration. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, a physical server is migrated to a virtual server, which may then be adopted by a new physical server. When the physical server is migrated, the physical server contacts a multi-appliance management application to determine a location on a storage network for replacement storage. The physical server copies its data volumes to the replacement storage. The migration process also converts the operating system of the physical server into a virtual server. The virtual server is a software incarnation of the physical server, and can be run using a generic hardware server. The data of the physical server stored in the replacement storage is linked to the virtual server. In this way, a physical server is migrated to a virtual server. The embodiments described herein allow a physical server to easily by converted into a virtual server, allowing any fungible server to run the virtual server, and allowing the hardware running the virtual server to easily be upgraded in the future.

Figure 1:
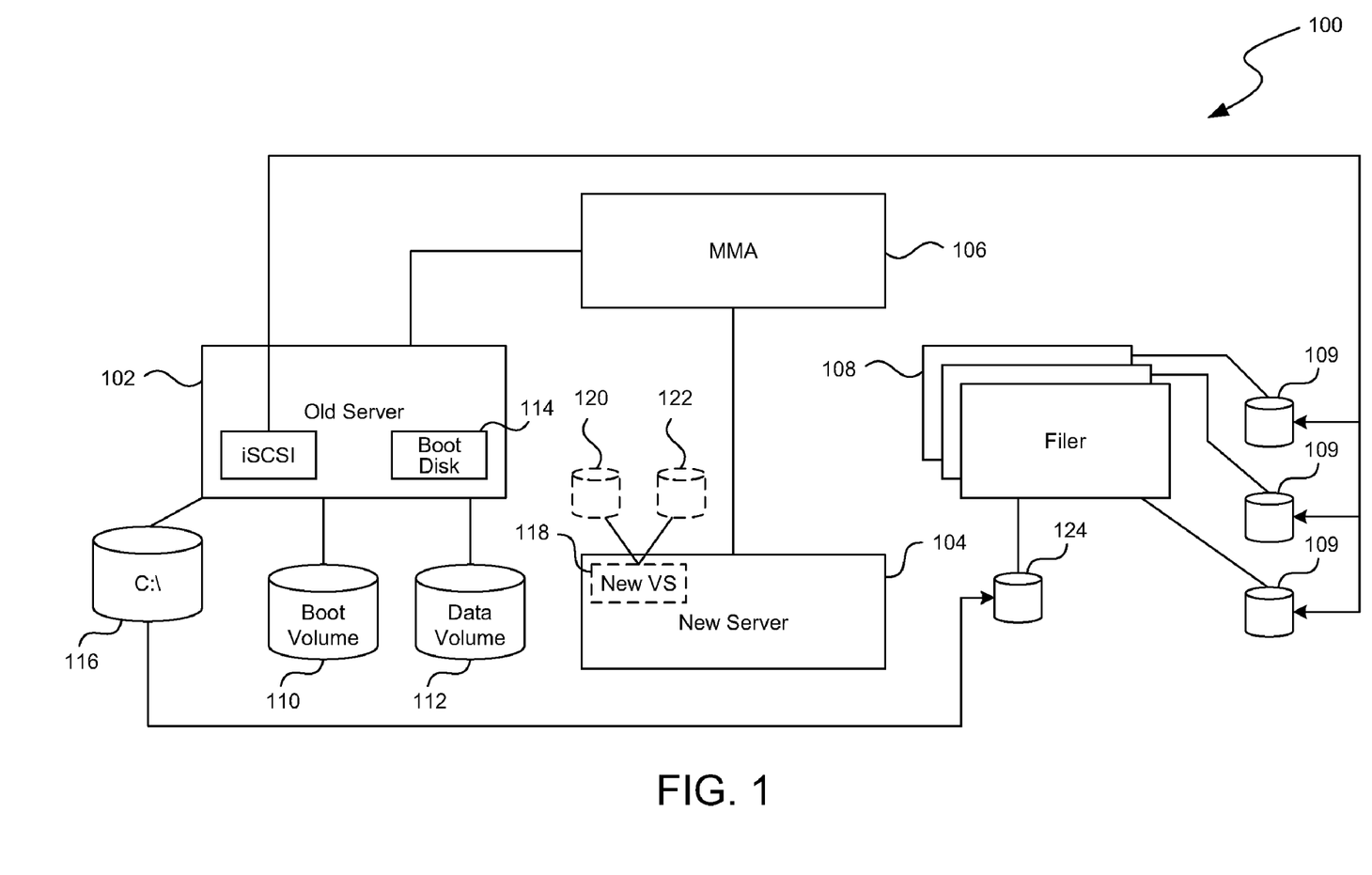
FIG. 1 illustrates a storage network for migrating a physical server to a virtual server.

FIG. 1 illustrates a storage network 100 for migrating a physical server to a virtual server. The system 100 includes an "old" server 102, a "new" server 104, a Multi-Appliance Management Application (MMA) 106, and several filers 108. The old server 102 is the server which is being retired, and from which data are being migrated. The old server 102 is a processing system that may be any type of server, such as a web server or a network server. For example, the server 102 may be a server on which local or remote clients store data. The old server 102 is a server which a user (such as a system administrator) wishes to replace, but the user also wants to retain the old server's 102 function. The new server 104 is a physical replacement for the old server 102. The new server 104 may replace the hardware components of the server 102 with newer, upgraded components, or the new server 104 may replace a damaged old server 102. As will be described below, a virtual server image will be created from the software and data stored on the old server 102. The virtual server image is a software or data component that mimics the function of the old server 102. The new server 104 is a physical server that will operate the virtual server of the old server. The new server 104 is fungible; it is a server without data storage that provides processing service over a network. The new server 104 is fungible in that any appropriate server may be used as the new server 104, and also in that the new server 104 may be replaced at any time. The old server 102 may be any type of networked server. The functionality of the old server 102 and the new server 104 will be explained below.

The MMA 106 can be used to maintain the storage network 100. The MMA 106 is a type of storage server management application (SSMA) that can be use to monitor data storage over a network on several different processing systems. The MMA 106 can be used to monitor the storage on the filers 108. A system administrator can maintain the filers 108 using the MMA 106, ensuring that the filers 108 continue to have adequate free space, that certain users are not monopolizing storage on a filer, etc. An example of such an MMA is the DataFabric Manager® (DFM) products made by Network Appliance, Inc. in Sunnyvale, Calif. The MMA 106 may provide a Graphical User Interface (GUI) that allows the administrator to more easily observe the condition of the filer. The MMA 106 may comprise an application on another server, or it may be a hardware device on the storage network 100.

The filers 108 are network appliances. A network appliance is a processing system that may be connected to a network to provide service to other devices over the network. A filer is a form of storage server which provides file storage and file access to remote clients that request access to the data storage. Another type of storage server, which may be implemented as an appliance, is one which provides clients with block-level access to stored data, rather than file-level access. Such a server can be used in a storage area network (SAN), for example, to provide an interface between clients and mass storage devices. It is understood that although filers are discussed specifically, any type of networked data storage may be used with embodiments of the invention.

The filers may control storage such as several volumes 109. As will be explained below, the storage in the volumes 109 may be partitioned by the MMA 106 for use by the old server 102. A filer 108 may manage one or more of the volumes 109, depending on the configuration of the filer 108. The MMA 106 stores information about each of the filers 108 and the volumes 109 that the filers 108 are managing. In this way, the MMA 106 is able to provide information to the old server 102 about replacement storage available on the volumes 109.

The filers 108 have Internet small computer systems interface (iSCSI) functionality. The small computer systems interface (SCSI) protocol is a protocol used for data transfer within processing systems. For example, the SCSI protocol is often used to link storage drives to other system devices such as host bus adapters. The iSCSI protocol is a networked version of the SCSI protocol that allows users to use the SCSI protocol over a network, such as the Internet. For example, the iSCSI protocol may be used to copy data from the old server 102 to a filer 108 over the storage network 100. It is understood that even though the iSCSI protocol is discussed herein, other protocols may be used with the embodiments of the invention. The iSCSI protocol is useful in that it allows easy data transfer over networks while mimicking local data transfers.

A logical unit number (LUN) is an identifier assigned to a SCSI device. Each LUN is a unique number that identifies a specific logical unit, which may be a disk drive, end user, file, or application program. Here, a LUN may also be used to identify a parcel of storage, and a filer 108 or other system may access the storage by referencing the LUN. The SCSI protocol can then use the LUN to transmit data to and from a SCSI device identified by the LUN. LUNs are also used with the iSCSI protocol. In terms of the embodiments described herein, LUNs are identifiers used to identify storage created on the volumes 109. A particular parcel of replacement storage may have one or more LUN assigned to it, as the storage may span one or more physical drives.

The old server 102 includes a boot volume 110 and a data volume 112. The boot and data volumes 110 and 112 may encompass several physical drives. The old server 102 may further implement a networked storage protocol, such as the iSCSI protocol. The iSCSI protocol allows the storage network 100 to issue LUNs to storage on the storage network. For example, replacement storage assigned to the old server 102 may have one or more LUNs that identify the location of the storage. The replacement storage is the storage assigned to the old server 102 by the MMA 106. The replacement storage is sufficient to house the contents of the data volume 112.

The old server 102 may be booted using a boot disk 114 such as a bootable compact disk-read only memory (CD-ROM). The boot disk 114 overrides the boot instructions of the boot volume 110, and begins the migration process. The migration process is the process of migrating the boot and physical volumes 110 and 112 to a virtual server image and the replacement storage, respectively. An image of a volume is a data structure that contains data sufficient to reconstruct the volume. For example, an image of a boot volume may include all of the files of the operating system such that if the image is restored, the restored boot volume will be identical to the original boot volume. The boot disk 114 includes instructions to create a virtual server image 116 of the boot drive 110. The process performed by the boot disk 114 is explained below. It is understood that devices other than a boot disk 114 may be used. For example, the old server 102 may be booted over the network 100.

A virtual server is a software routine that mimics the function of a physical server such as the old sever 102. A virtual server image is the image of the virtual server that may be mounted on a physical server to emulate another physical server. Mounting refers to loading a virtual server image such that a virtual server may be run on a fungible server such as the new server 104. When the virtual server is mounted, the virtual server is operational and that the virtual server responds in the same way that the physical server would. For example, a virtual server 118 identical to the old server 102 may be created. The virtual server 118 can then be mounted by the new server 104, and the new server 104 adopts the "personality" of the old server 102. The new server 104 responds to user and other requests in the same fashion that the old server 102 did. Therefore, the migration from the old server 102 to a virtual server running on the new server 104 is transparent to the end user. The virtual server 118 also controls "virtual" copies 120 and 122 of the volumes 110 and 112. During the creation of the virtual server image, the virtual server image is linked to the replacement storage used to store the copy of the data volume 112. The virtual sever 118 thereby has the same access to the contents of the data volume 112 that the old server 102 did.

When the virtual server image 116 is completed, it is copied and stored in a database of virtual servers 124. The new server 104 can contact the MMA 106 to locate a virtual server to operate. The new server 104 is fungible; it can operate any virtual server in the database 124. The database of virtual servers 124 may be managed by one of the filers 108.

The MMA 106 may perform a process known as provisioning to determine an appropriate filer on which to store the virtual server image 116 and on which to copy the data drives 112. Provisioning includes examining storage (such as the volumes 109) to determine the best location for the MMA's 106 needs. Provisioning may consider the amount of available storage in a volume, the accessibility of the storage, the condition of a filer 108 managing the available storage, etc. Provisioning is described in U.S. Pat. No. 6,801,992, entitled "System and Method for Policy Based Storage Provisioning and Management," issued on Oct. 5, 2004. The MMA 106 has knowledge of all of the filers 108 under its control. The MMA 106 knows how much free space is available on the filers 108, and can use that information to determine the best filer or filers to store the data of the old server 102. During the provisioning process, the MMA generates storage areas referred to by LUNs on the filers 108 and reports the LUNs to the old server 102. The old server 102 can then use the LUN(s) to find the replacement storage allocated to it.

Figure 2:
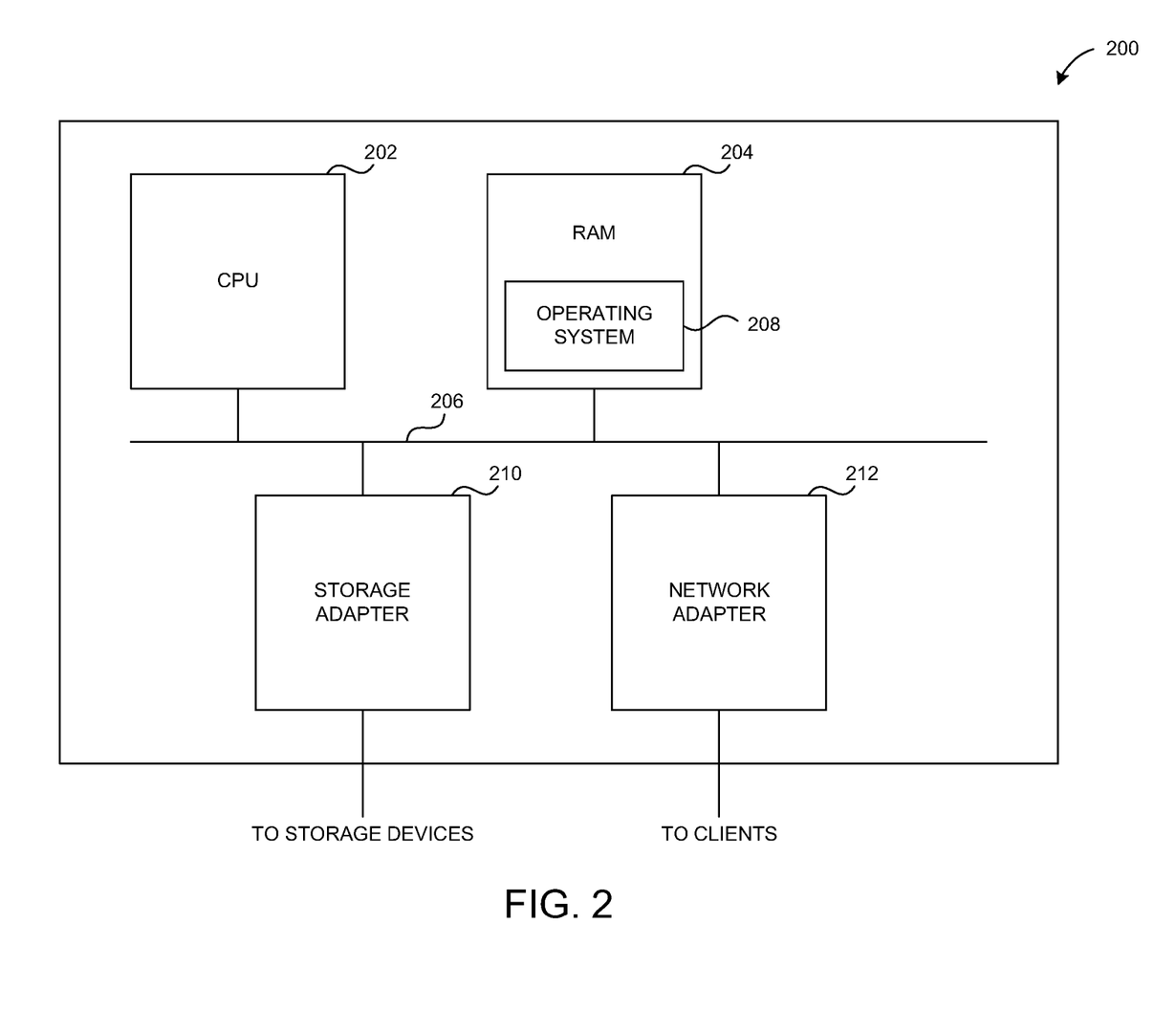
FIG. 2 shows the architecture of a filer.

FIG. 2 shows the architecture of a filer 200, representative of any of the filers 108, according to certain embodiments of the invention. A filer is a type of storage server used to store file data. Note that certain standard and well-known components which are not germane to the present invention are not shown. The filer 200 includes a processor 202 and main memory 204, coupled together by a bus system 206. The bus system 206 in FIG. 2 is an abstraction that represents any one or more separate physical buses and/or point-to-point connections, connected by appropriate bridges, adapters and/or controllers. The bus system 206, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 202 is the central processing unit (CPU) of the filer 200 and, thus, controls the overall operation of the filer 200. In certain embodiments, the processor 202 accomplishes this by executing software stored in main memory 204. The processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 204, which is generally some form of random access memory (RAM), stores at least a portion of the operating system 208 of the filer 200. Techniques of the present invention may be implemented within the operating system 208, as described further below. The operating system 208 may be, for example, the DataONTAP® operating system by NetApp®. Also connected to the processor 202 through the bus system 206 are a storage adapter 210 and a network adapter 212. The storage adapter 210 allows the filer 200 to access the external mass storage devices and may be, for example, a Fibre Channel (FC) adapter or SCSI adapter. The network adapter 212 may include an Infiniband, FC, Ethernet, or other adapter, and may provide a connection allowing remote clients to communicate with the filer 200.

Figure 3:
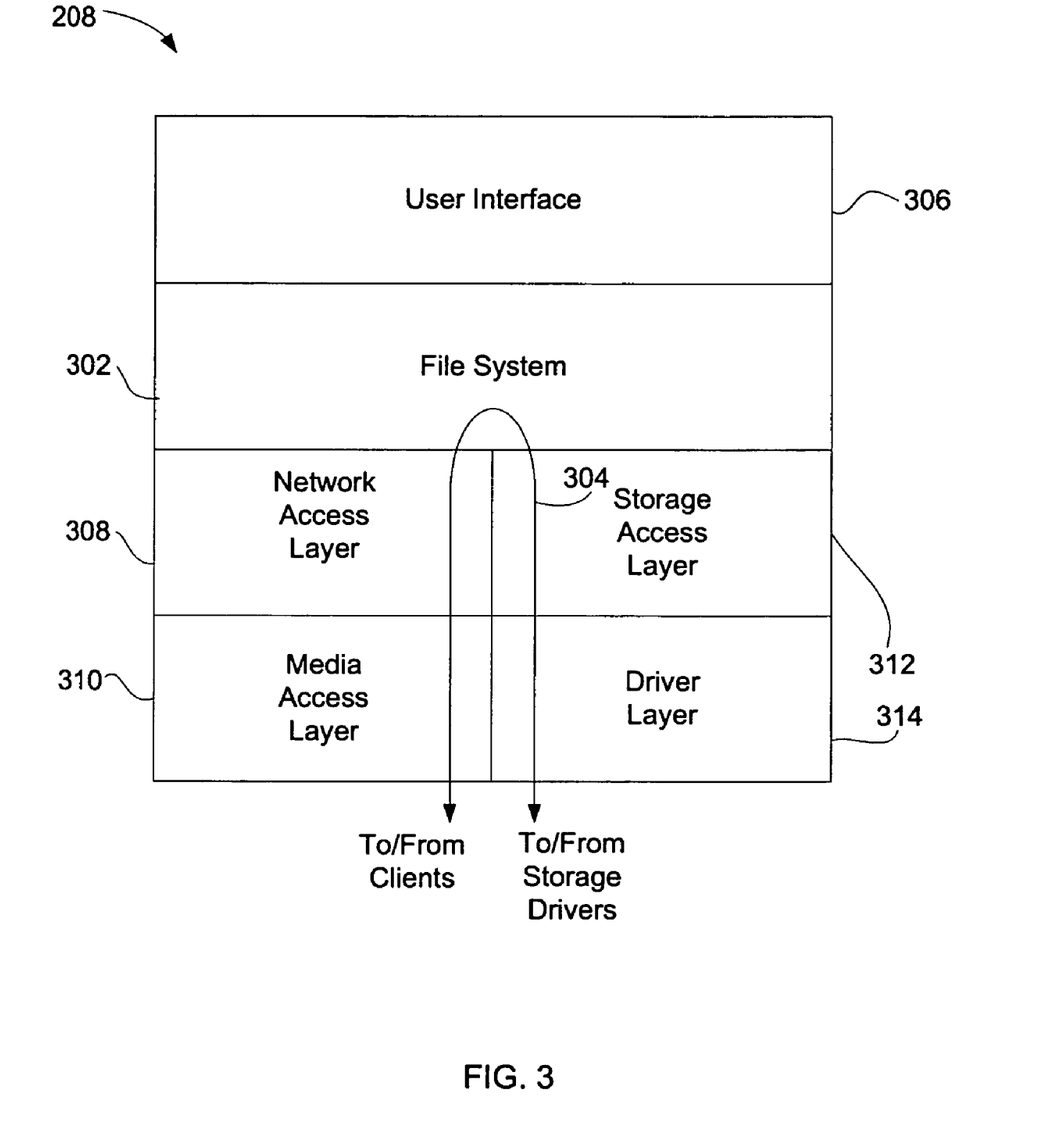
FIG. 3 illustrates the operating system of the filer.

FIG. 3 illustrates the operating system 208 of the filer 200, according to certain embodiments of the invention. As can be seen, the operating system 208 includes a number of layers. The core of the operating system 208 is the file system 302. The file system 302 is a programmatic entity that imposes structure on an address space of one or more physical or virtual storage devices, such as disks, so that the operating system 208 may conveniently read and write data containers, such as files and blocks, and related metadata. The file system 302, among other responsibilities, executes read and write operations on the mass storage devices in response to client requests, maintains directories, and manages consistency point operations. An example of the file system 302 suitable for this purpose is the Write Anywhere File Layout (WAFL) file system from Network Appliance, such as used in the NetApp® Filers. Also shown in FIG. 3 is the logical data path 304 from clients to mass storage devices, through the file system 302.

The operating system 208 also includes a user interface 306, through which a network administrator or other user can control and/or configure the filer 200 of FIG. 2 (e.g., remotely from a management station). The user interface 306 may generate a command line interface and/or a graphical user interface for this purpose.

The client side of the operating system 208 includes a network access layer 308 and, at the lowest level, a media access layer 310. The network access layer 308 implements any of various protocols used to communicate with client devices, such as iSCSI, network file system (NFS), common Internet file system (CIFS) and/or hypertext transport protocol (HTTP). The media access layer 310 includes one or more drivers which implement the protocols used to communicate over the network, such as Ethernet.

On the storage device side, the operating system 208 includes a storage access layer 312 and, at the lowest level, a driver layer 314. The storage access layer 312 implements a disk storage protocol such as redundant array of independent disks (RAID), while the driver layer 314 implements a lower-level storage device access protocol, such as Fibre Channel or SCSI. RAID is a way of storing the same data in different places (i.e., redundantly) on different disks. Any type of RAID, such as double-parity RAID, or RAID-DP by Network Appliance of Sunnyvale, Calif.

Figure 4:
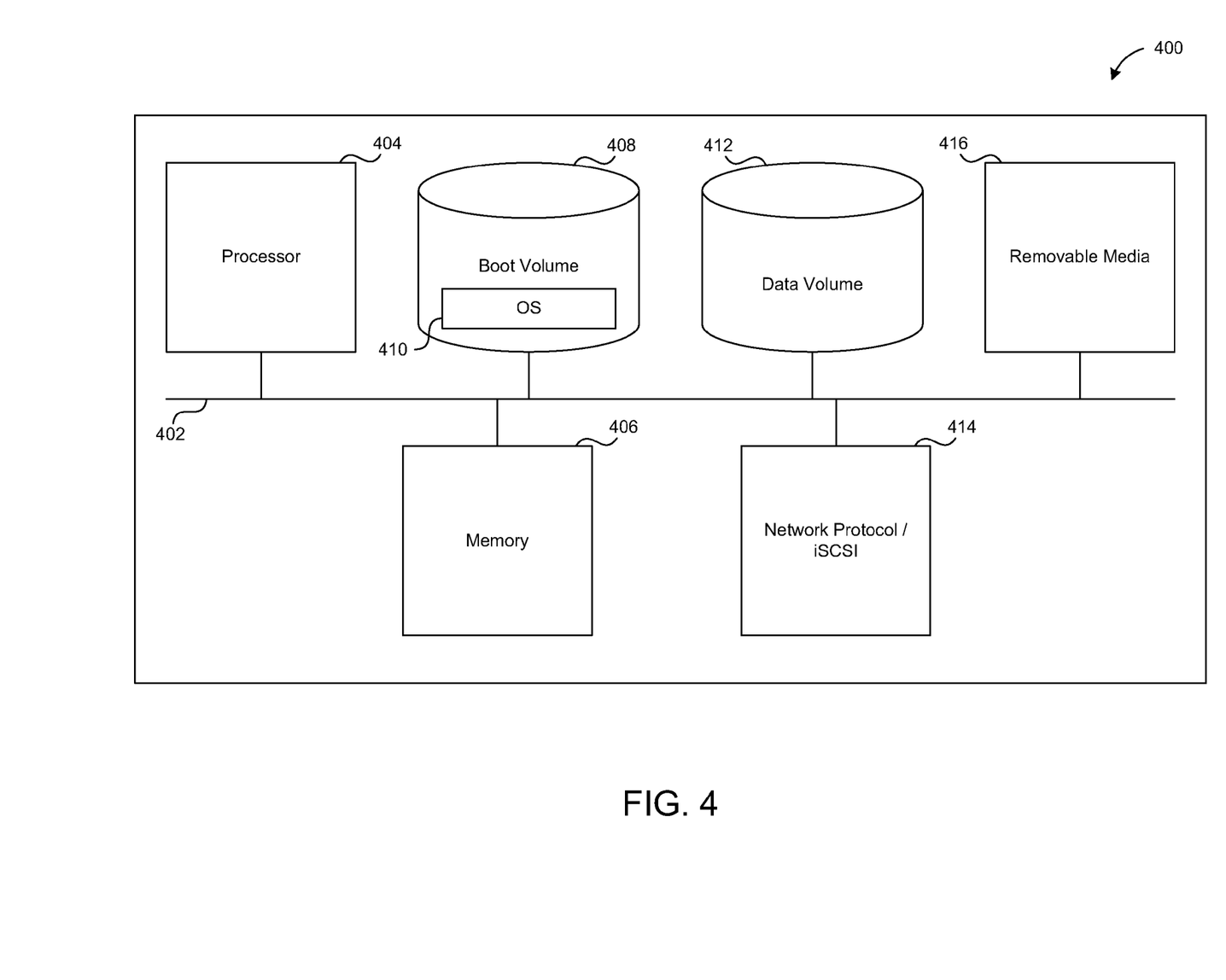
FIG. 4 illustrates a traditional server.

FIG. 4 illustrates a traditional server 400. The server 400 may be representative of the old server 102. The server 400 includes a bus 402, which may represent one or more interconnected buses of the server 400. Connected to the bus 402 is a processor 404, a memory 406, a boot volume 408 including an operating system 410, a data volume 412, and a network adapter 414. The server 400 is a general purpose server, that provides service to clients. The server 400 may have a specific function defined by the operating system 410. For example, the server 400 may be a web server that provides data to clients over an HTTP network.

The processor 404 may be any appropriate processor, including those manufactured by Intel, International Business Machines (IBM), and Motorola. The memory 406 may include random access memory (RAM), read only memory (ROM), flash memory, etc. The boot volume 408 is an individual volume including the operating system 410 that includes instructions to boot the server 400. As mentioned above, the boot volume 408 may be overridden by using a boot disk 114 including instructions to begin the migration process. The boot disk 114 may be introduced through a removable media drive 416. The removable media drive 416 may be, for example, a CD-ROM or other optical drive, a floppy drive, or a removable memory drive (e.g., a flash memory drive). The data volume 412 stores applications and application data used by the server 400. The boot volume 408 and the data volume 412 may be located on separate physical drives, or may both be located on a single physical drive. If located on a single physical drive, the boot volume 408 and the data volume 412 may be separate partitions of the physical drive.

The network adapter 414 allows communication over the storage network 100. The network adapter 414 may use any of several protocols. According to one embodiment, the network adapter 414 uses the iSCSI protocol to transmit data, which allows the server 400 to transmit data using the SCSI interface over a network such as the storage network 100.

Figure 5:
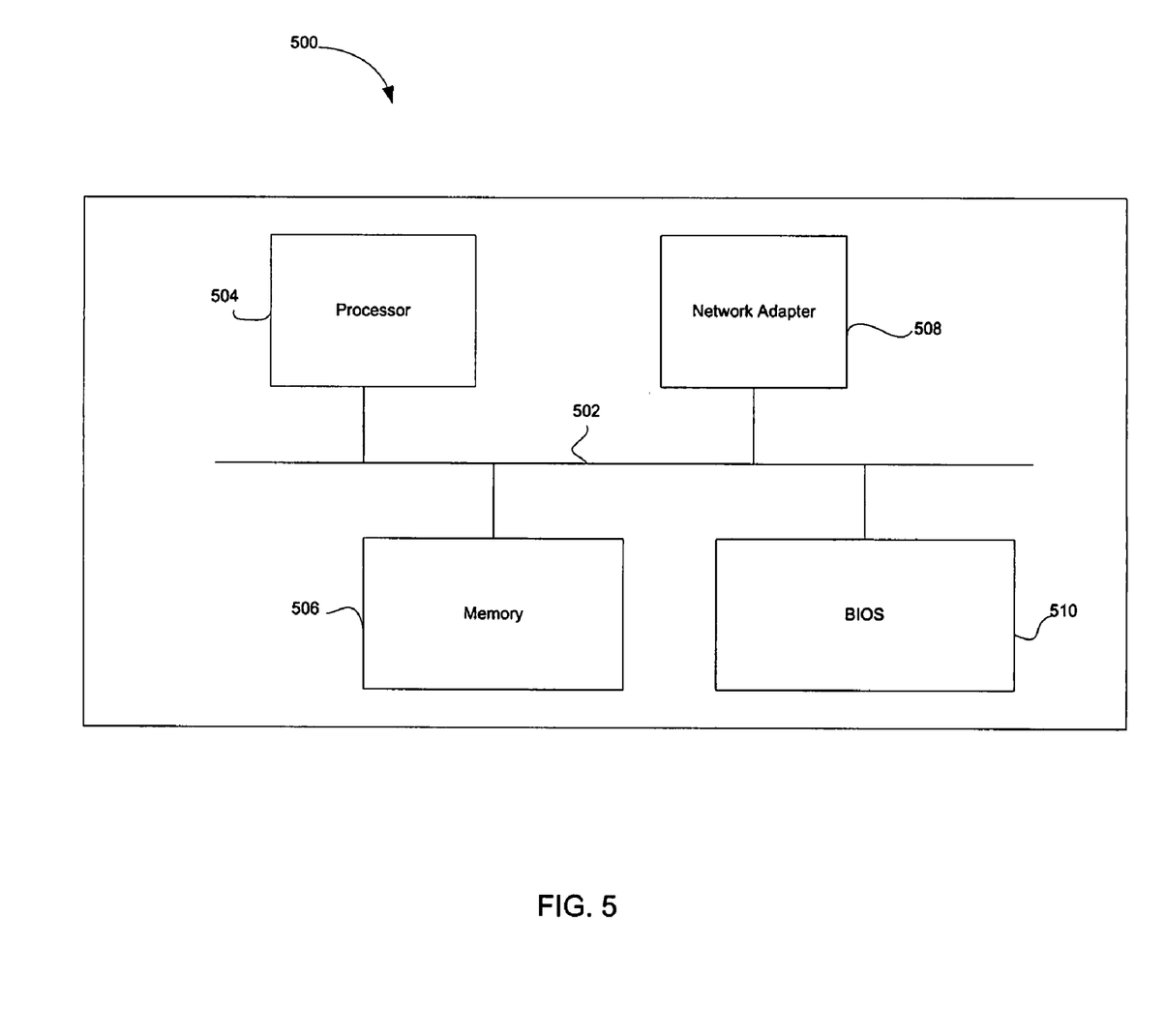
FIG. 5 illustrates a fungible server.

FIG. 5 illustrates a fungible server 500. The new server 104 is an example of a fungible server 500. The fungible server 500 may be connected to the storage network 100 to perform various functions required by other members of the network 100. The fungible server 500 may be used to perform processing functions for other entities. For example, the fungible server 500 may include a boot sequence that instructs the fungible server 500 to request a virtual server image from the MMA 106. The fungible server 500 can then run that virtual server. In this way, the new server 104 can perform the functions of the old server 102, even though the new server 104 has no internal storage. By running the virtual server image of the old server 102, the new server 104 behaves in the same manner as the old server 102. The new server 104 can then access the data formerly in the data volume 112 by requesting the data from the filer 108 storing the needed data.

The fungible server 500 may be, for example, a server in a rack mount system. When the fungible server 500 is upgraded, it may be upgraded by removing it from the rack mount and replacing it with another server. Using the embodiments described herein, there is no need to migrate the volumes again, since the newest server can request the same virtual server image that the fungible server 500 was running.

The fungible server 500 includes a bus 502, which may be one or more interconnected buses. Connected to the bus 502 are a processor 504, a memory 506, a network adapter 508, and a basic input/output system (BIOS) 510. The processor 504 may be any appropriate processor for the application, such as those manufactured by Intel or Motorola. The memory 506 may include several different types of memories, including RAM, ROM, flash memory, etc. The network adapter 508 may be an iSCSI adapter or another appropriate adapter such as Ethernet, Fibre Channel, etc.

The BIOS 510 boots the fungible server 500. When the fungible server 500 is booted, the BIOS 510 instructs the fungible server 500 to request a virtual server image to run. The fungible server 500 may then ask the MMA 106 for an available virtual server image. In another embodiment, the fungible server 500 may request two or more virtual server images to be run simultaneously.

Figure 6:
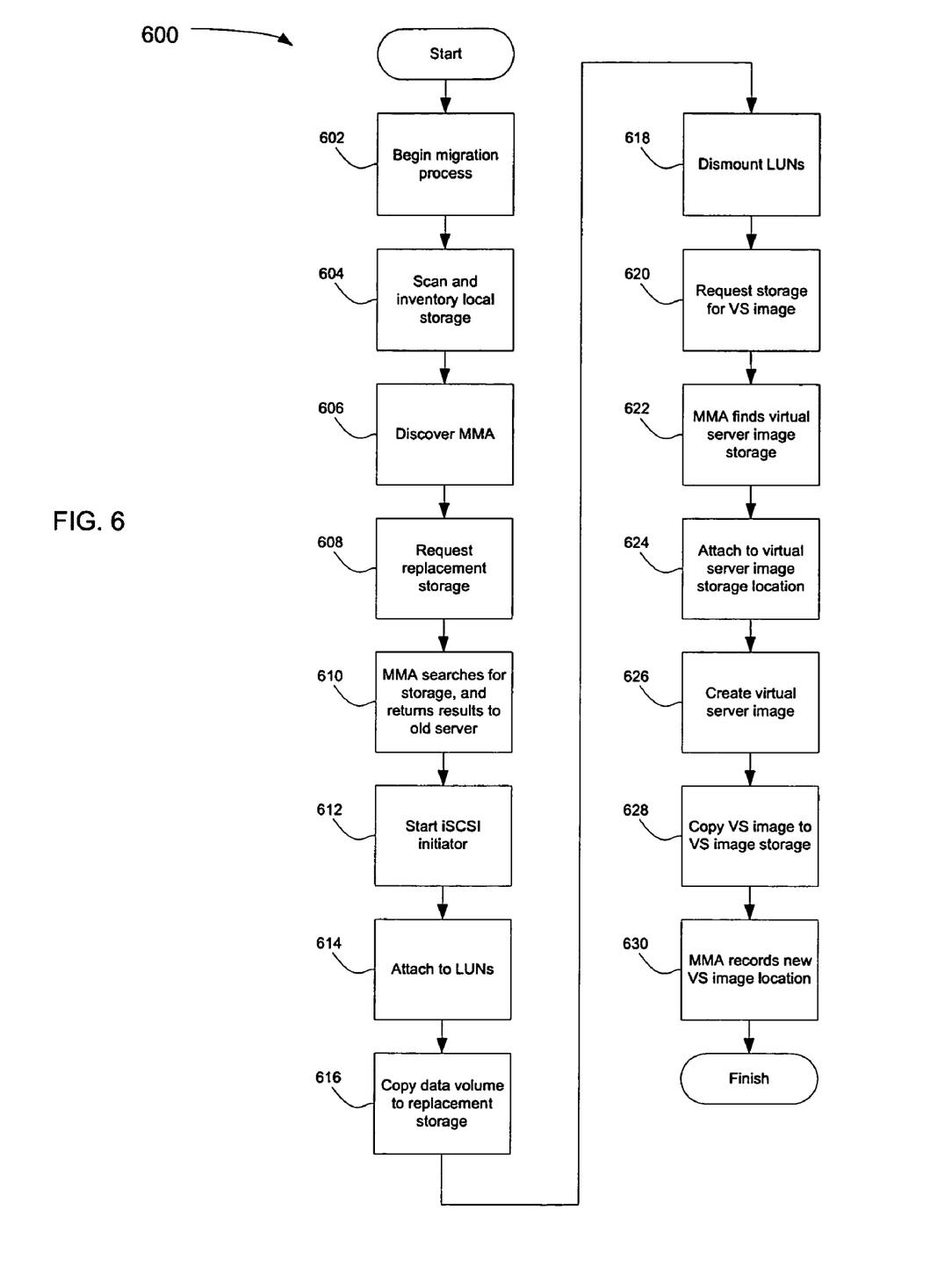
FIG. 6 is a flowchart describing a process for migrating the old server to a virtual server.

FIG. 6 is a flowchart describing a process 600 for migrating the old server 102 to a virtual server. The process 600 describes the creation of the virtual server from the point of view of the old server 102. Certain references are made to elements shown in FIG. 1.

In block 602, the migration process is started. The migration process may be started by inserting a boot disk 114 into the old server 102 and booting the old server 102 using the boot disk 114. In block 604, the old server 102 scans and inventories its local storage. The old server 102 determines what data is stored on the boot and data volumes 110 and 112. Specifically, the old server 102 determines the size of the data stored on the volumes, and the size needed for the replacement storage.

In block 606, the old server 102 discovers the MMA 106. The old server 102 needs to find the MMA 106 on the storage network 100 in order to communicate with the MMA 106. In block 608, the old server 102 requests replacement storage from the MMA 106. The MMA 106, as explained above, finds the replacement storage using a process known as provisioning. The MMA 106 knows the status of all filers 108 and volumes 109, and stores the status in a filer status database. The MMA can search the volumes 109 to determine which filer 108 has the best storage for the old server 102. The best storage is the storage that is physically sufficient and quickly accessible based on what the old server 102 has requested.

In block 610, the MMA 106 searches for storage, and reports the results to the old server 102. The MMA 106 locates the replacement storage for the old server 102 on one or more filers 108. A LUN may be used to designate a specified storage area of the volumes 109. The MMA 106 then assigns storage corresponding to one or more LUNs to the replacement storage and reports the LUNs of the storage to the old server 102. The old server 102 can use the storage corresponding to the LUNs to establish a connection and transmit the contents of the volumes 110 and 112 to the replacement storage.

In block 612, the migration process starts an iSCSI initiator on the old server. The iSCSI initiator is a software routine that allows the old server to use the SCSI protocol over a network. In block 614, the migration process attaches to the storage corresponding to the new LUNs. This allows the old server to transmit the data in the volumes 110 and 112 over the storage network to the replacement storage. In block 616, the old server 102 copies the contents of the data volume 112 to the storage corresponding to the new LUNs over the storage network 100. The data is stored in the replacement storage on one or more of the filers 108 that is referred to by the LUNs. In block 618, the LUNs are dismounted (i.e., the storage corresponding to the LUNs is no longer used by the migration process). After the old server 102 has finished copying the contents of the data volume 112, the old server 102 no longer needs access to the replacement storage.

In block 620, the old server 102 requests storage for a virtual server image. The old server 102 issues a request to the MMA 106, and in block 622, the MMA 106 uses the provisioning feature to find storage for the virtual server image. The MMA 106 then assigns LUNs to the virtual server image storage and reports the LUNs to the old server 102. The virtual server image storage is in the virtual server image database 118. In block 624, the migration process attaches the old server 102 to the virtual server image storage location. The old server 102 may initiate an iSCSI attachment to the LUNs of the virtual server image storage.

In block 626, the old server 102 packages the operating system and the remainder of the boot volume 110 into a virtual server image. Packaging may include collecting the files or data comprising the operating system, coalescing the files or data into a single data structure (i.e., the package), optionally compressing the data or files, and writing the package to a designated location. The virtual server image will be used by a fungible server 500 to mimic the old server 102. The virtual server image also includes references to the new location of the contents of the data volume 110. The package does not include the data volume 112, which was earlier copied to the replacement storage. In block 628, the virtual server image is copied to the virtual server image storage provided by the MMA 106. In block 630, the old server 102 records the new image location and the identification of the new LUNs of the virtual server image with the MMA. When a fungible server 500 is requesting a virtual server to run, the MMA 106 can provide the reported LUNs to the fungible server 500.

Figure 7:
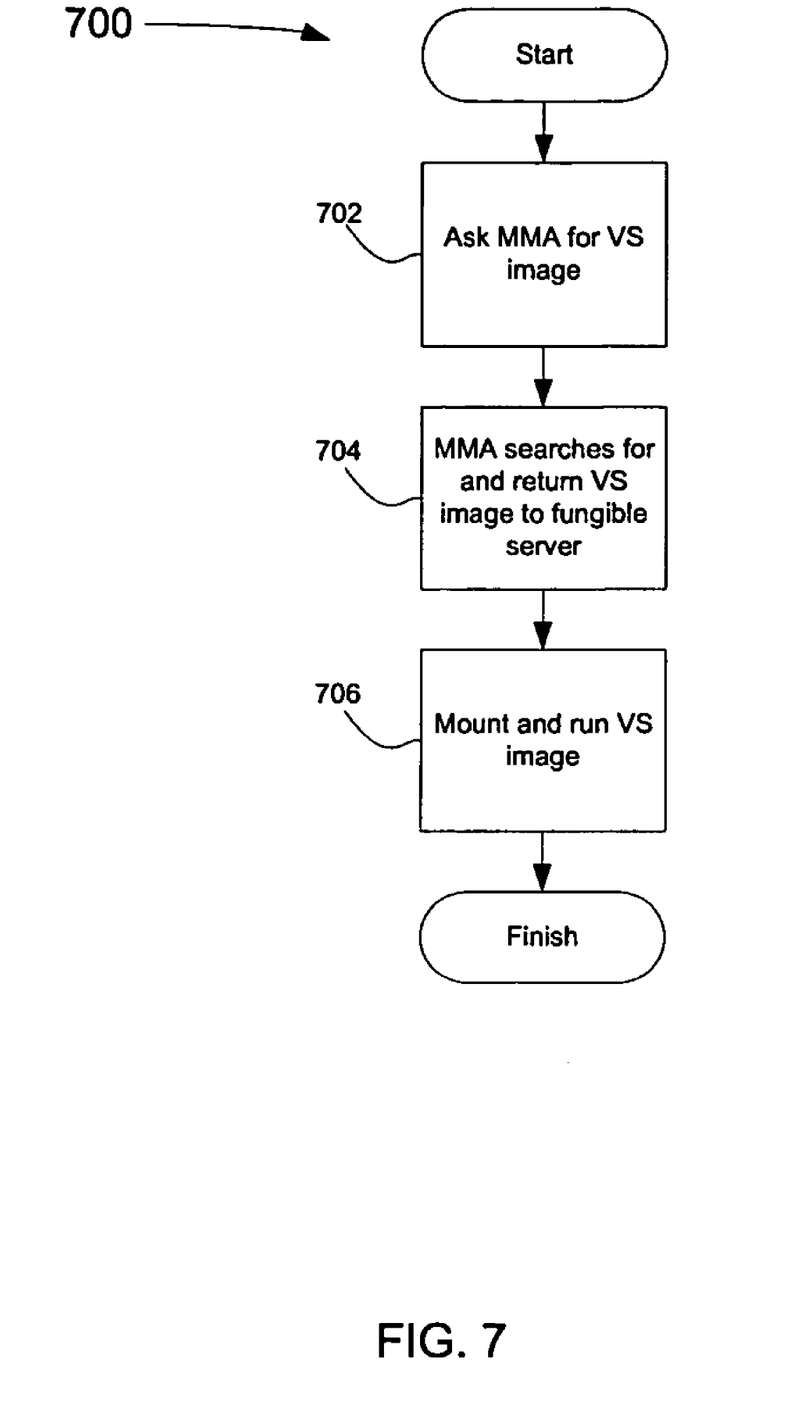
FIG. 7 is a flowchart describing a process for running a virtual server image on a fungible server.

FIG. 7 is a flowchart describing a process for running a virtual server image on a fungible server 500. The process 700 can be used by a fungible server 500 being attached to a storage network 100. The process 700 may be executed by a virtual server hosting program that is either an application run on the fungible server 500, or is part of the operating system of the fungible server 500.

In block 702, the fungible server 500 asks the MMA 106 for a virtual server image to run. The fungible server 500 contacts the MMA 106 over the storage network 100, typically in response to a command to do so during booting. In block 704, the MMA 106 searches for and returns a virtual server image to the fungible server 500. The MMA 106 includes a list of virtual server images created by the old server 102 and other servers that are not currently being run. The MMA 106 returns one of these images to the fungible server 500. In another embodiment, the MMA 106 may search for a virtual server image that is appropriate for the fungible server 500. For example, the MMA 106 may search for a virtual server image that was created by a server having specifications similar to the fungible server 500 that has requested the image.

In block 706, the fungible server 500 mounts the drive on which the virtual server image is located, and begins running the virtual server image. The fungible server 500 then assumes the function of whichever physical server created the virtual server image. For example, if the old server 102 created the virtual server image, the fungible server 500 (for example, the new server 104) begins running the image and functions in the same manner as the old server 102, including having access to the replacement storage containing the contents of the data volume 112.

The preceding discussion has focused primarily on iSCSI storage networks. It is understood that the discussed embodiments of the invention may also be practiced on other types of networks, such as Ethernet networks, internet protocol/transmission control protocol (IP/TCP) networks, Fibre Channel networks, Infiniband networks, etc. Further, the servers and other processing systems have been described with specific components. Other components having similar functionality may also be used in place of those described herein.

The techniques introduced above have been described in the context of a storage area network (SAN) environment. However, these techniques can also be applied in various other contexts. For example, the techniques introduced above can be applied in a network attached storage (NAS) environment. One difference between NAS and SAN is that in a SAN, the storage server (which may be an appliance) provides a remote host with block-level access to stored data, whereas in a NAS configuration, the storage server provides clients with file-level access to stored data. Additionally, a device may also include both a SAN and a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative rather than in a restrictive sense.

What is claimed is:

1. A method for migrating a physical server to a virtual server comprising:
   initiating a migration process in response to a boot sequence of the physical server, said migration process including:
      discovering a storage server management application (SSMA);
      requesting replacement storage from the SSMA;
      receiving a replacement storage location from the SSMA;
      copying a data volume of the physical server to the replacement storage;
      creating a virtual server image of the physical server based on a boot volume of the physical server, wherein the boot volume includes an operating system of the physical server and wherein the virtual server image does not include the data volume of the physical server;
      receiving a virtual server image location from the SSMA; and
      copying the virtual server image to the virtual server image location.

2. The method of claim 1, further comprising:
   contacting the SSMA and requesting an available virtual server image to run in response to running a virtual server hosting program on a second server; and
   mounting the virtual server image to the second server.

3. The method of claim 1, wherein the migration process further comprises:
   inventorying local storage of the physical server; and
   packaging a boot volume of the physical server into the virtual server image.

4. The method of claim 1, wherein receiving a replacement storage location from the SSMA comprises:
   creating a provision for the replacement storage; and
   reporting the provision to the physical server.

5. The method of claim 4, wherein creating a provision for the replacement storage comprises:
   scanning at least one data storage device for sufficient available storage; and
   creating a logical unit number (LUN) for the replacement storage.

6. The method of claim 2, wherein the second server is a fungible server.

7. The method of claim 4, wherein creating a provision for the replacement storage comprises:
   searching a set of storage servers for available storage sufficient for a data volume; and
   denoting the available storage as the replacement storage.

8. A method for migrating a physical server to a virtual server comprising:
   initiating a migration process during a boot sequence of the physical server;
   discovering a storage server management application (SSMA); and
   performing the migration process, on the physical server, in response to discovering the SSMA, wherein, said migration process comprises:
      inventorying a boot volume and a data volume of the physical server, wherein the boot volume includes an operating system of the virtual server;
      requesting replacement storage from the SSMA sufficient to store the data volume;
      receiving a replacement storage location from the SSMA;
      copying the data volume to the replacement storage;
      receiving a virtual server image location separate from the replacement storage location from the SSMA;
      creating a virtual server image based on the boot volume of the physical server, wherein the virtual server image does not include the data volume of the physical server; and
      copying the virtual server image to the virtual server image location.

9. The method of claim 8, wherein creating a virtual server image comprises:
   packaging the boot volume into the virtual server image.

10. The method of claim 8, further comprising:
    finding the replacement storage amongst a set of filers.

11. The method of claim 10, wherein finding the replacement storage comprises:
  searching a filer status database for information about the set of filers; and
  selecting a filer from the set of filers having sufficient storage for the replacement storage.

12. The method of claim 8, further comprising:
  requesting a virtual server image from the SSMA in response to executing a virtual server hosting program on a fungible server;
  receiving the virtual server image location from the SSMA; and
  mounting the virtual server image on the fungible server.

13. The method of claim 11, further comprising:
  assigning a logical unit number (LUN) to the replacement storage.

14. A processing system, comprising:
  a bus;
  a processor coupled to the bus;
  a memory coupled to the bus;
  a boot device coupled to the bus; and
  a boot volume and a data volume coupled to the bus, wherein the boot volume includes an operating system of the physical server;
  wherein the processor requests replacement storage for the data volume from a storage server management application (SSMA), receives a replacement storage location from the SSMA, and copies the data volume to the replacement storage location;
  wherein the processor requests virtual server image storage from the SSMA, receives a virtual server image location from the SSMA, packages the boot volume into a virtual server image, wherein the virtual server image does not include the data volume of the physical server, and copies the virtual server image to the virtual server image location.

15. The processing system of claim 14, wherein the replacement storage is on a replacement storage volume managed by a filer.

16. The processing system of claim 15, wherein the filer is accessible by the processing system over a network.

17. The processing system of claim 15, wherein the SSMA searches a set of filers for the replacement storage.

18. The processing system of claim 17, wherein when the SSMA finds the replacement storage, the SSMA assigns a logical unit number (LUN) to the replacement storage.

19. The processing system of claim 17, wherein the virtual server image is stored in a virtual server image database coupled to the set of filers.

20. The processing system of claim 14, wherein a second server mounts the virtual server image and replaces the processing system.

21. A machine readable storage medium having stored thereon executable program code which, when executed, causes a machine to perform a method for migrating a physical server to a virtual server, the method comprising:
  initiating a migration process during a boot sequence of the physical server;
  discovering a storage server management application (SSMA); and
  performing the migration process in response to discovering the SSMA, wherein said migration process includes:
    inventorying a boot volume and a data volume, wherein the boot volume includes an operating system of the physical server;
    requesting replacement storage from the SSMA;
    receiving a replacement storage location from the SSMA;
    copying the data volume of the physical server to the replacement storage location;
    creating a virtual server image of the physical server based on the boot volume of the physical server, wherein the virtual server image does not include the data volume of the physical server;
    requesting a virtual server image location from the SSMA; and
    copying the virtual server image to the virtual server image location.

22. The machine readable storage medium of claim 21, the method further comprising:
  contacting the SSMA and requesting an available virtual server image to run in response to executing a virtual server hosting program on a second server; and
  mounting the virtual server image to the second server.

23. The machine readable storage medium of claim 21, wherein creating a virtual server image of the physical server comprises:
  packaging the boot volume of the physical server into the virtual server image.

24. The machine readable storage medium of claim 21, wherein receiving a replacement storage location from the SSMA comprises:
  creating a provision for the replacement storage in response to the physical server requesting a replacement storage location; and
  reporting the provision to the physical server by the SSMA.

25. The machine readable storage medium of claim 24, wherein creating a provision for the replacement storage comprises:
  scanning at least one data storage device for sufficient available storage; and
  creating a logical unit number (LUN) for the replacement storage.

26. The machine readable storage medium of claim 22, wherein the second server is a fungible server.

27. The machine readable storage medium of claim 24, wherein creating a provision for the replacement storage comprises:
  searching a set of storage servers for available storage sufficient for a data volume; and
  denoting the available storage as the replacement storage.

* * * * *

UNITED STATES PATENT AND TRADEMARK OFFICE
CERTIFICATE OF CORRECTION

PATENT NO. : 7,640,292 B1  Page 1 of 1
APPLICATION NO. : 11/117967
DATED : December 29, 2009
INVENTOR(S) : Peter L. Smoot It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Ninth Day of November, 2010

David J. Kappos
*Director of the United States Patent and Trademark Office*